United States Patent [19]

Chen

[11] 3,914,422

[45] Oct. 21, 1975

[54] PROCESS FOR PREPARATION OF COMMON MULLET ROE

[76] Inventor: Yung Kong Chen, 1111 Arlington Blvd., Suite 319, Arlington, Va. 22209

[22] Filed: May 14, 1974

[21] Appl. No.: 469,771

[52] U.S. Cl. .............. 426/248; 426/513; 426/289; 426/295; 426/643
[51] Int. Cl.$^2$ ............................................ A23B 4/04
[58] Field of Search ............ 426/8, 47, 58, 55, 129, 426/212, 241, 242, 245, 246, 248, 376, 348, 332, 472, 513, 295, 289

[56] References Cited
UNITED STATES PATENTS

| | | | |
|---|---|---|---|
| 2,643,952 | 6/1953 | Crowther et al. | 426/376 |
| 3,759,718 | 9/1973 | Sugihara et al. | 426/376 |

Primary Examiner—A. Louis Monacell
Assistant Examiner—R. B. Penland
Attorney, Agent, or Firm—Mason, Mason & Albright

[57] ABSTRACT

Preparation of roe of the family mugilidae known as the common or striped mullet (*mugil cephalus*) for consumption wherein the ovarian membrane enclosing the roe is first cleaned and dried and then impregnated with salt either in brine or dry form. Thereafter, the membrane is encapsulated with an absorbent material composed of cloth or paper to form an envelope which is placed on a flat horizontal surface and pressed from above with a further flat surface with sufficient pressure, 0.25 – 1.5 pounds per square inch applied to the membrane, to flatten it without rupturing. The pressure is maintained for a period of about 8 to 100 hours to flatten the membrane to approximately one-half of its original height in an ambient temperature of 40° – 100°F. Upon removal of the flattened envelope from the pressure, the envelope and any other extraneuous material is stripped from the membrane and same is dried for a period of four to fifteen days in a predetermined ambient relative humidity not in excess of 75% as required to achieve a desired mositure content of the membrane and roe — the weight of same having been reduced by about one-half in the process.

10 Claims, 1 Drawing Figure

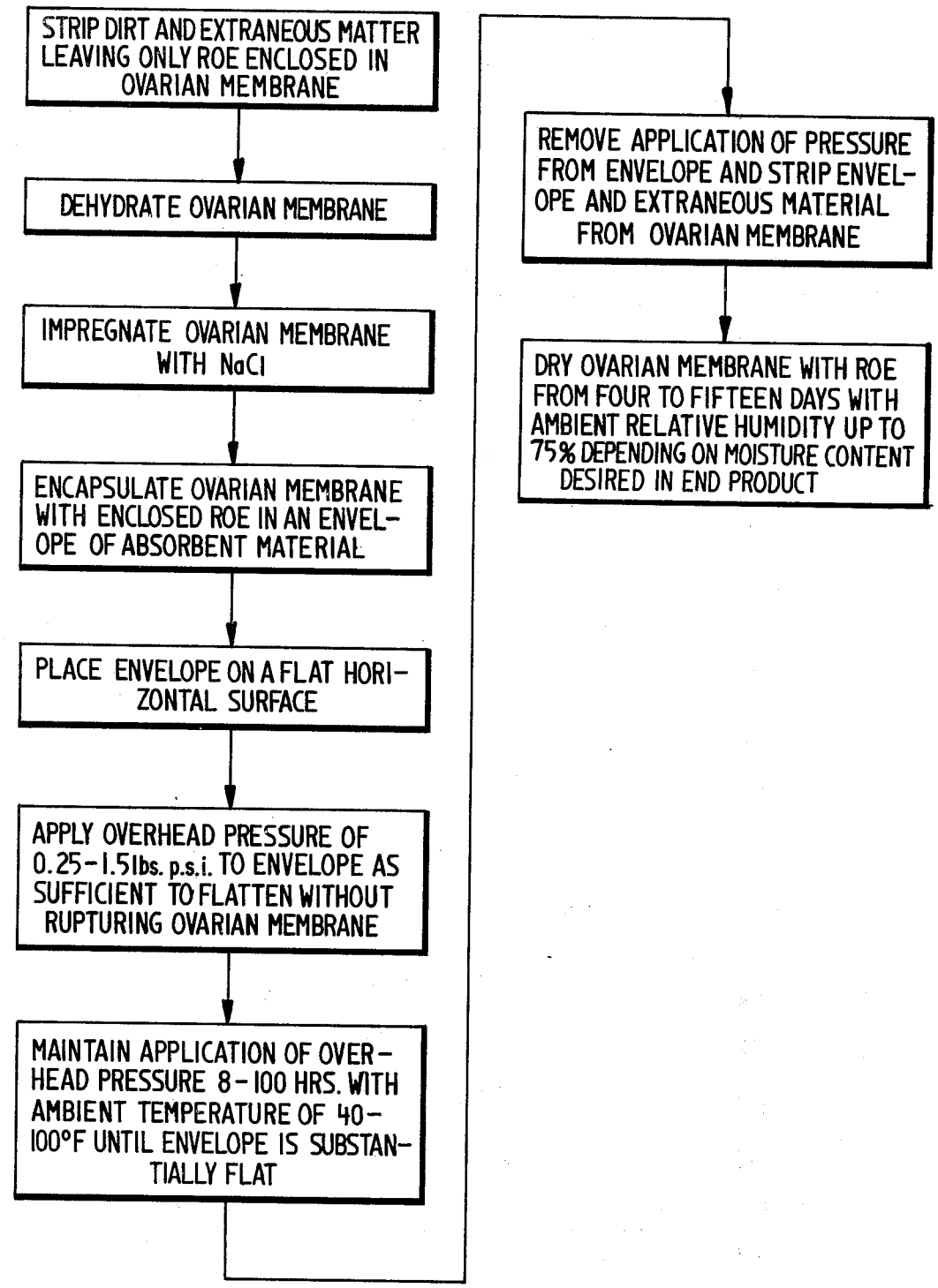

PROCESS FOR PREPARATION OF COMMON MULLET ROE

SUMMARY OF THE INVENTION

The invention relates to a process for the preparation of common or striped mullet roe where by the use of natural means the roe is transformed into a seafood delicacy. The most common species, *Mugil cephalus*, of the family Mugilidae known as mullet provide a wholesome food. Grey mullet are a bluish-silvery fish with stout cylindrical bodies about 1 to 2 feet long. They have a tender flesh containing a yellowish, mild flavored oil. A great number of these fish live close to shore in nearly all temperature and tropical waters. The common or striped mullet may weight up to 10 to 12 pounds and these fish are plentiful around the Florida keys and on the Gulf Coast. The yearly world catch of mullet exceeds 2,000,000 metric tons. Fish is marketed whole in sizes of ½ to 3 pounds, filleted in larger sizes, weigh smoked in all sizes. The roe of these fish may wiegh anywhere from 4 ounces to 2 pounds and more likely in the 8 to 12 ounce range. The roe are encased in the ovarian membrane which is usually several inches long and wide and has a thickness in the range of one-quarter to one-half inch. The roe are a known seafood delicacy and are generally consumed in the natural state parboiled, fried or creamed or after being salted. In the southern states, the September mullet are known to run larger than other seasons and some are heavy with roe. In the North Carolina coastal area, mullet are a common source of fish roe.

I have found that by the utilization of natural means mullet roe within the ovarian membrane including the membrane itself can be processed to provide a distinctive and rare seafood delicacy which has a capacity of being transported or stored for a number of days without deterioration. The roe is thus prepared in a manner whereby its weight is substantially reduced and its preservation as a food is extended for a considerable period of time.

Other adaptabilities and capabilities of my invention will be understood by those skilled in the art as the description progresses, reference being had to the accompanying drawing wherein the steps of my process are set forth in outline form.

DESCRIPTION OF THE PREFERRED EMBODIMENTS

Initially the mullet roe are removed from the fish while still contained within its ovarian membrane and an important aspect of the invention involves the care and treatment of the roe within the membrane without rupturing the membrane.

The removed ovarian membranes with mullet roe are cleaned of blood, dirt and other extraneuous matter to leave only the membrane surrounding the roe. All the water is then removed from the surface of the membrane by means of cloth or paper towel so that the membrane is completely dried. Next, salt is applied completely over the membrane either as a brine or in the solid form. The salt normally used for this is ordinary sodium chloride. However, sea salt and, if desired, seasoning may be applied at this time. With salt so applied to the membrane, it is completely wrapped in an absorbent material — either a cloth or paper thus to encapsulate the membrane with an envelope of absorbent material. This envelope is then placed on a flat horizontal surface. Experience has indicated that the surface must be very flat and even. The envelope is covered with a further flat surface and a weight of about ten to fifty pounds is placed on the upper surface whereby the actual pressure, applied uniformly to the envelope, is in the range of 0.25 – 1.5 pounds per square inch. It is of prime importance that the weight does not cause the ovarian membrane to rupture. With the pressure thus applied to the envelope, the temperature of same is kept within a range of 40°–100°F. and preferably about 70° – 90°F. for a period of at least 8 hours and preferably 24 hours so that the envelope together with the membrane becomes very flat. The desired flatness should be obtained within a period of at least 4 days (or about 100 hours) which is considered a maximum period of time for this step of the process. The thickness should be reduced by about half in this step. If desired, additional weight may be added after a period of time — at least 8 hours — if it appears that the necessary flattening of the envelope and membrane with the roe is not occurring.

When a desired flatness has been achieved, the envelope is removed from the pressure and stripped from the membrane which is then dried and placed in a space which preferably has a relatively humidity of less than 50% although for certain applications it may be as high as 75%. Here the membrane together with the roe encased therein is allowed to dry for a period of from 4 to 15 days. If local conditions permit, the drying may be accomplished naturally under the sun. It is believed important that the membrane and roe receive the broad spectrum of radiations which are emitted from the sun, particularly at the infrared and ultraviolet ends of the spectrum. This seems to ensure that the roe within the membrane as well as the membrane itself are thoroughly dried. By this time the membrane together with the roe weigh approximately one-half of the amount they originally weighed at the commencement of the process.

The amount of moisture remaining in the membrane and roe is determined by the existing relative humidity and the number of days the membrane and roe are permitted to dry. Moisture content is also effected to some degree by the intensity of the radiation applied thereto. The moisture content affects the flavor whereby with increased moisture content the flavor is improved to most palates. Increased dryness tends to decrease the flavor of the resulting product and, in addition, makes it somewhat easier to store for longer periods of time. Thus, in addition to size and weight, the finished product may be graded by its degree of dryness — this being a matter of choice to the purchaser depending upon his particular taste and the length of time he intends to store the product.

Although I have described the preferred process which embodies my invention, it is to be understood that it is capable of other adaptations and modifications within the scope of the appended claims.

Having thus described my invention, what I claim as new and desire to secure by Letters Patent of the United States is:

1. A process for preparing mullet roe which comprises the steps of cleansing an ovarian membrane which encloses mullet roe of extraneous material, drying of the ovarian membrane and impregnating it with salt, encapsulating the ovarian membrane containing the roe with absorbent material, placing the envelope of the ovarian membrane with roe so formed on a flat horizontal surface and pressing said envelope from above with a further flat surface whereby the pressure applied to said envelope is sufficient to flatten the ovarian membrane without rupturing same, maintaining application of said pressure for a period of at least eight hours with a surrounding ambient temperature of 40°–100°F. until said envelope is substantially flat, removing application of said pressure from said envelope and stripping same together with the salt and other extraneous material from said ovarian membrane, and drying said ovarian membrane and the enclosed roe for a period of at least 4 days within a predetermined ambient relative humidity of not in excess of 75 percent as required to achieve the desired moisture content of said ovarian membrane and enclosed roe.

2. A process in accordance with claim 1, wherein said salt comprises a brine when applied to said ovarian membrane to impregnate same.

3. A process in accordance with claim 1, wherein said absorbent material is composed of paper.

4. A process in accordance with claim 1, wherein said pressure is applied to said material for a period of at least 24 hours.

5. A process in accordance with claim 4, wherein said pressure is applied to said material for a period not to exceed 100 hours.

6. A process in accordance with claim 1, wherein said pressure applied to said ovarian membrane is in the range of about 0.25 to 1.5 pounds per square inch over said membrane.

7. A process in accordance with claim 1, wherein said ambient temperature while applying said pressure is in the range of 70°–90°F.

8. A process in accordance with claim 1, wherein said drying period does not exceed 15 days.

9. A process in accordance with claim 8, wherein radiation from the sun is applied to said ovarian membrane and enclosed roe for at least part of said drying period.

10. A process in accordance with claim 9, wherein said radiation comprises both ultraviolet and infrared radiations.

* * * * *